United States Patent [19]

Middleton

[11] 3,849,221

[45] Nov. 19, 1974

[54] METHOD FOR MANUFACTURING A SHEATHED CABLE FOR USE IN POST-TENSIONING CONCRETE STRUCTURES

[75] Inventor: Thomas E. Middleton, Houston, Tex.

[73] Assignee: Pre-Stress Concrete, Inc., Houston, Tex.

[22] Filed: Mar. 13, 1972

[21] Appl. No.: 233,946

Related U.S. Application Data

[62] Division of Ser. No. 860,737, Sept. 24, 1969, Pat. No. 3,654,027.

[52] U.S. Cl. ............... 156/145, 156/201, 156/213, 156/215, 156/289, 156/307, 156/322, 52/230
[51] Int. Cl. ....... B29c 17/00, E04c 3/10, E04c 5/08
[58] Field of Search ............ 156/54, 200, 201, 203, 156/213, 215, 236, 289, 145, 438, 466, 307, 322; 52/223 R, 230; 117/134

[56] References Cited
UNITED STATES PATENTS

| | | | |
|---|---|---|---|
| 435,629 | 9/1890 | Holcombe............................ | 156/54 |
| 2,140,213 | 12/1938 | Tegarty............................... | 156/203 |
| 2,234,523 | 3/1941 | Fischer et al. ...................... | 156/54 |
| 2,389,725 | 11/1945 | Gillis et al............................ | 156/54 |
| 3,011,933 | 12/1961 | Barnes et al. ..................... | 156/54 X |
| 3,223,571 | 12/1965 | Straughan....................... | 156/200 X |
| 3,260,636 | 7/1966 | Witzenmann...................... | 156/203 |
| 3,446,691 | 5/1969 | Mundie............................ | 156/203 X |
| 3,540,959 | 11/1970 | Connor................................ | 156/203 |
| 3,575,769 | 4/1971 | Radzio............................ | 156/203 X |
| 3,579,931 | 5/1971 | Lang................................... | 52/230 |
| 3,654,027 | 4/1972 | Middleton........................ | 156/54 X |

Primary Examiner—Charles E. Van Horn
Assistant Examiner—Basil J. Lewris
Attorney, Agent, or Firm—Jack R. Springgate; Joe R. Edwards; M. H. Gay

[57] ABSTRACT

A method and apparatus for manufacturing a loose sheathed cable for use as a posttensioned reinforcing member in concrete structures including first advancing and lubricating the cable. A plastic strip is advanced adjacent to the cable and heat is applied to soften the edges of the strip. The plastic strip is then formed into a sheath about the cable with the softened edges in overlapping relationship. A solvent applicator is interposed between the overlapping edges to uniformly apply a solvent coating to the contiguous surfaces of the edges. The softened, solvent coated edges are then urged together to form a bond. The exterior of the overlapped portion of the plastic sheath may be lubricated to cool the heated edges and to reduce friction as the sheathed cable comes into contact with additional members which press the overlapped edges together to ensure a good bond.

3 Claims, 10 Drawing Figures

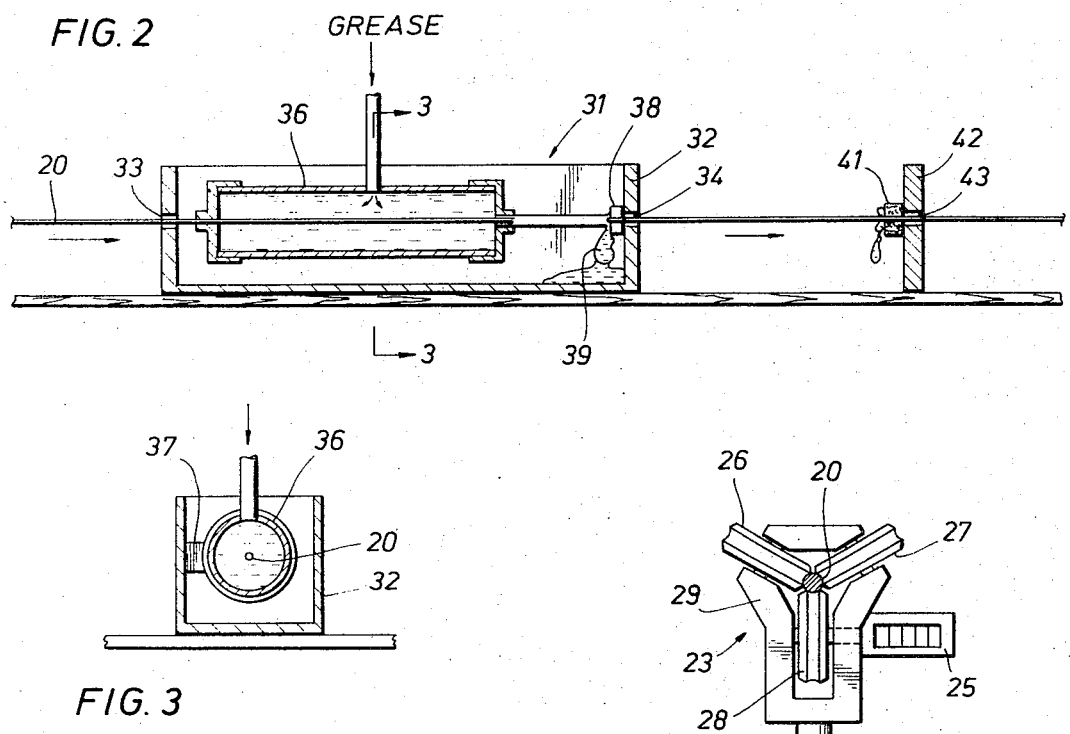
FIG. 2
FIG. 3
FIG. 4
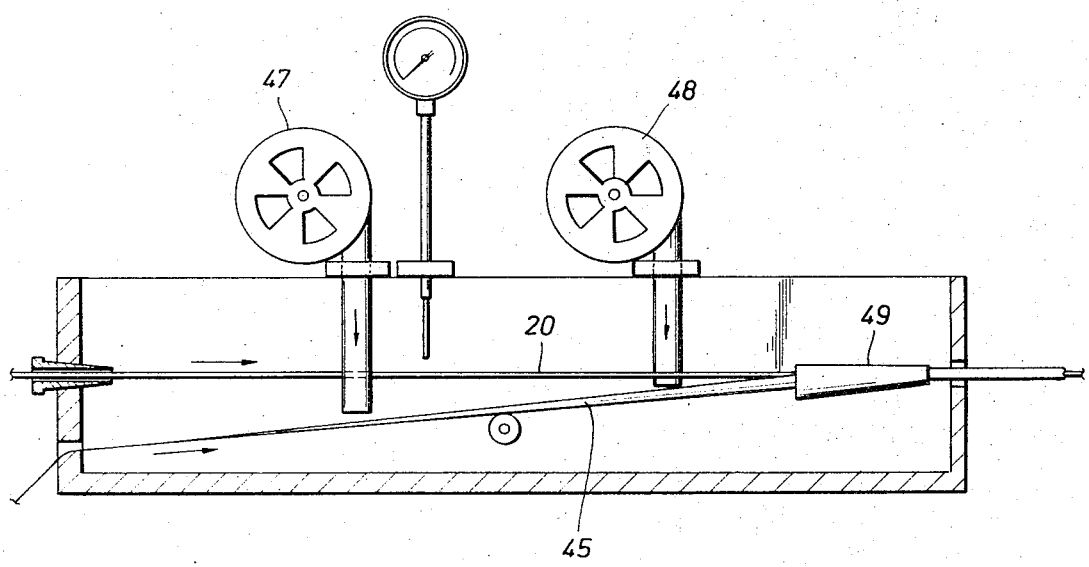
FIG. 5

METHOD FOR MANUFACTURING A SHEATHED CABLE FOR USE IN POST-TENSIONING CONCRETE STRUCTURES

CROSS-REFERENCE TO RELATED APPLICATIONS

This application is a division of my prior copending application Ser. No. 860,737 filed Sept. 24, 1969, now U.S. Letters Pat. No. 3,654,027.

BACKGROUND OF THE INVENTION

This invention relates to a method and apparatus for manufacturing cable having a loose sheath and particularly, for manufacturing loose sheathed cable for use in post-tensioned concrete structures wherein the sheathed cable is embedded in concrete, and tension is subsequently applied to the cable to pre-stress the concrete structure.

It is well known that concrete is considerably stronger in compression than in tension. In fabricating concrete structures for use in applications where tensile as well as compressive stresses are involved, it is necessary to prestress the concrete in order to counteract the tensile stresses that will be produced. Ordinarily, the two methods that are used to fabricate pre-stressed concrete structures are pretensioning and post-tensioning. In pretensioning, high strength steel bars, wires or cables, generally called tendons, are stretched between the end points of a concrete form, and a large tensile stress is applied thereto. Then the concrete is poured into the forms and allowed to set to form a concrete structure. When the concrete is set, the external tension on the tendons is relieved, transferring the pre-stress to the concrete through the bond between the concrete and the steel. Thus, the induced compressive stresses in the concrete tend to counteract the tensile forces that will be produced when the structure is placed in its load-bearing position.

In post-tensioning, the tendons are positioned in the concrete form, but have no considerable tensile stress applied thereto. A small stress may be applied to maintain the tendon in a straight line so as to properly position it within the concrete structure. The concrete is then placed in the forms and allowed to set. When the concrete has gained sufficient strength, the tendons are tensioned, generally by using a hydraulic jack or the like. The tensioned tendons are then anchored to the ends of the concrete structure to pre-stress the structure. It is necessary in post-tensioning to prevent the tendons from initially bonding to the concrete. This is accomplished by wrapping or encasing the tendon in a sheath.

In some instances, plastic tubes are positioned in the concrete form prior to placing the concrete. After the concrete sets, the plastic tubes are removed, leaving a hole through the concrete into which the tendons can be threaded. Then tension can be applied thereto, and the tendons anchored to the ends of the concrete structure. It is frequently necessary to force grout into the area between the tendon and the concrete structure to fill the relatively large space therebetween to prevent cracking. By utilizing a tendon or cable which is encased in a loose sheath, and positioned before placing the concrete, a considerable amount of time and effort is saved.

Many attempts have been made to economically produce a cable having a loose sheath which is suitable for use in post-tensioning concrete structures. One of these involves helically wrapping a paper strip about a cable to form a sheath. This proved to be unsatisfactory since the sheathed cable required very special care in handling; otherwise the paper would rip, completely destroying the utility of the sheathed cable for use in post-tensioning in the field. Other methods involved glueing a plastic sheath around a cable. However, when the sheathed cable was taken out into the field in a hot climate, the glue would often melt, thereby opening the sheath. To solve this problem, wire was helically wrapped around the glued sheath to hold the sheath closed. However, the wire wrapped about the cable made the cable somewhat difficult to handle, and also it had to be applied very carefully so that it would not cut through the sheath. Additionally, unsuccessful attempts have been made to form a sheath about a cable by heat sealing or using a solvent to seal the overlapping edges of a plastic strip. But in all such attempts, no method or apparatus was developed which would provide a securely bonded sheath which did not open in the field.

SUMMARY OF THE INVENTION

The subject method for making a cable having a loose sheath for use in post-tensioning concrete structures includes first lubricating the cable. Then a plastic strip is heated to soften the strip, and is then subsequently formed about the cable so that the edges of the strip are in overlapping relationship. A bonding agent is then applied to the overlapping edges of the plastic strip, and the edges are urged together so that a bond is effected. A lubricant is then applied to the exterior of the overlapping edges, and additional bonding forces are applied to only the overlapping edges to ensure an effective bond. The lubricant reduces the frictional and drag forces applied as the overlapping edges are held together.

The subject apparatus includes facilities for first guiding the cable from a reel and applying a lubricant to the cable to facilitate the subsequent relative movement between the sheath and the cable. Wipers are provided to remove excess lubricant so that a relatively uniform coating is applied to the cable. Heating facilities are provided to heat the plastic strip, particularly on the edges thereof to soften it. A forming member, having a substantially conically shaped inner surface, forms the heated plastic strip about the cable with the edges of the plastic strip positioned in overlapping relationship. Facilities are provided to apply a bonding agent, such as a solvent, to the overlapping edges of the plastic strip to bond them together to form a sheath. The sheathed cable then passes through a die member which urges the overlapping edges together to initially effect the bond. Lubricating facilities are then provided to apply a lubricant, such as oil, to the exterior of the overlapping edges to reduce friction as the sheathed cable passes by a plurality of additional die members which urge the overlapping edges of the strip together to ensure an effective bond.

The subject method and apparatus economically and effectively produces sheathed cable at realtively high speed which has a strong bond that is unaffected by high temperatures and rough handling. Additionally, the lubricant applied to the cable prior to its being sheathed facilitates the post-tensioning of the cable after the concrete structure is placed and sets. The plastic sheath about the cable, while being relatively loose, is still close enough so that it is not necessary to force grout into the space between the cable and the sheath.

Other advantages of the present invention will be apparent from the following detailed description when considered in conjunction with the following detailed drawings.

BRIEF DESCRIPTION OF THE DRAWINGS

FIG. 2 is an enlarged cross-sectional view of the lubricating facilities for applying a uniform coating of lubricant to the cable;

FIG. 3 is a cross-sectional view of the lubricating facilities in FIG. 2, taken along line 3—3;

FIG. 4 is a view of the cable aligning facilities taken along line 4—4 from FIG. 1;

FIG. 5 is an enlarged, partially cross-sectional view of the heating facilities and the forming member illustrating the heating of the plastic strip and the forming of the plastic strip about the cable;

DESCRIPTION OF THE INVENTION

Figure 1:
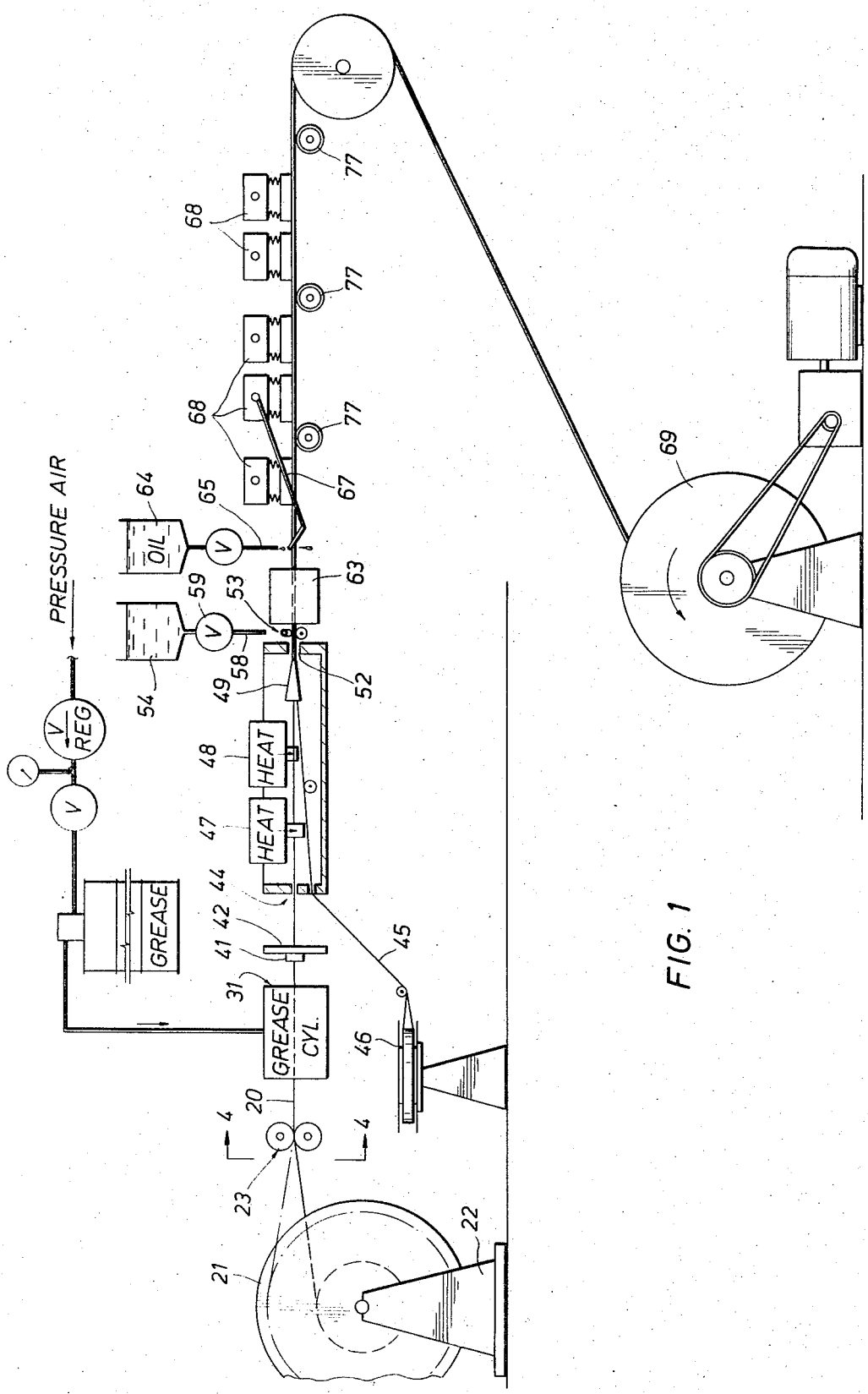
FIG. 1 is a representation of an assembly line for manufacturing the loose sheathed cable in accordance with the principles of this invention.

Referring to FIG. 1, there is shown an assembly line for manufacturing the loose sheathed cable. The cable 20 is supplied from a supply reel 21 which is rotatably mounted on a reel stand 22. The cable passes through a cable aligning assembly, generally designated as 23, which includes three substantially equidistantly spaced rollers 26, 27 and 28, supported by a member 29 as shown in FIG. 4. The aligning assembly 23 serves to align and guide the cable 20 as it is removed from the supply reel 21. Additionally, a counter 25 is connected to the shaft of roller 28 to count the footage of cable passing through the aligning assembly 23.

The cable 20 advances from the supply reel 21, through the aligning assembly 23, into a grease or lubrication assembly 31. The lubrication of the cable facilitates relative movement between the cable and the sheath during the post-tensioning of the cable in a concrete structure. The lubrication assembly 31 is shown in detail in FIG. 2 and includes a housing 32 having openings 33 and 34 at each end thereof to receive the advancing cable 20. Inside the housing 32 a pressurized grease cylinder 36 is mounted and supported so as to fully encompass the advancing cable 20. A support 37, shown in FIG. 3, secures the grease cylinder 36 to a side wall of the housing 32. The grease cylinder 36 is pressurized to force grease into the interstices of a stranded cable so that each strand is lubricated. A rust inhibitor may be added to the lubricant to provide a rust preventative coating on each strand of the cable.

Adjacent to the exit aperture 34 of the grease station 31 is positioned a resilient elememt 38, such as, for example, a sponge, which is placed around the advancing cable and serves to remove the excess grease from the cable as it passes out of the housing 32. Another sponge-like element 41 is positioned a short distance downstream and is mounted to a support 42 having an aperture 43 therein. This element 41 also serves to remove excess lubricant from the advancing cable 20 so that the cable and lubricant forms a substantially circular cross section. While the lubricating facilities have been described as being filled with grease, it is to be understood that any suitable lubricant, such as oil or wax, could be utilized for lubrication of the cable.

After the cable 20 is lubricated, it advances into heating facilities generally designated as 44. A strip of plastic 45, such as polyvinylchloride, is advanced into the heating facilities 44 from a supply reel 46. Heaters 47 and 48 are provided to heat and soften the plastic strip 45 to facilitate its subsequent formation and bonding about the cable 20. Additionally, the heat evaporates any moisture on the strip 45 which may prevent a subsequent good bond. Any type of heater may be utilized which will sufficiently soften the plastic strip.

Either one or a plurality of heaters may be utilized to heat the plastic strip 45. Referring to FIG. 5, there is shown a pair of heaters 47 and 48 which are hot air directional type heaters. Each heater is mounted so as to direct a stream of hot air onto one side of the advancing tape 45. This ensures that the edges of the tape in particular will be sufficiently heated. Heaters 47 and 48 advantageously maintain a temperature which, considering the speed of the advancing strip 45, softens but does not melt the plastic strip. Polyvinylchloride melts at approximately 170°F. However, because of the movement of the strip 45, it is advantageous to maintain the temperature of the heating facilities at 180° F. to 200° F. to quickly soften the strip.

Figure 6:
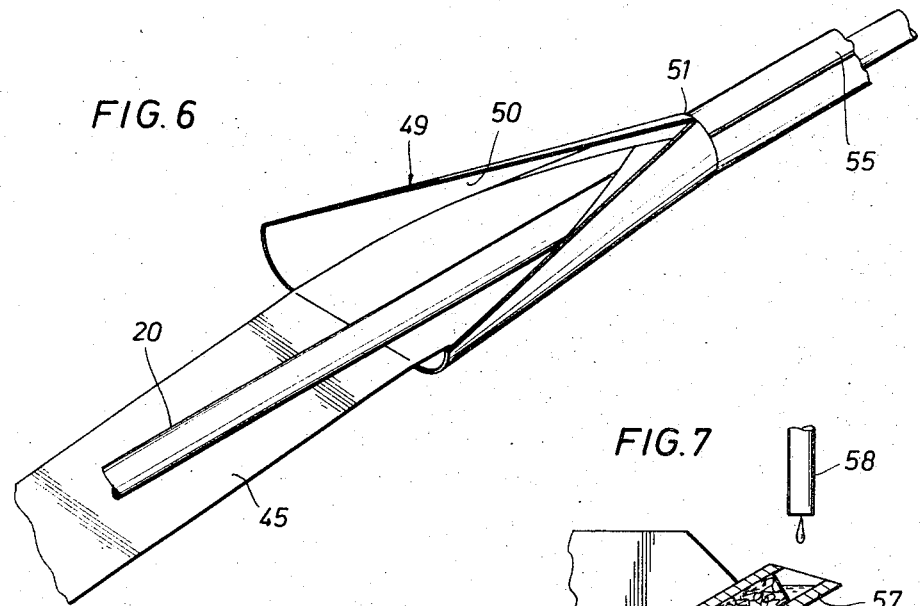
FIG. 6 is an enlarged, perspective view of the forming member shown in FIG. 1 and FIG. 5, illustrating the forming of the plastic strip about the cable.
Figure 8:
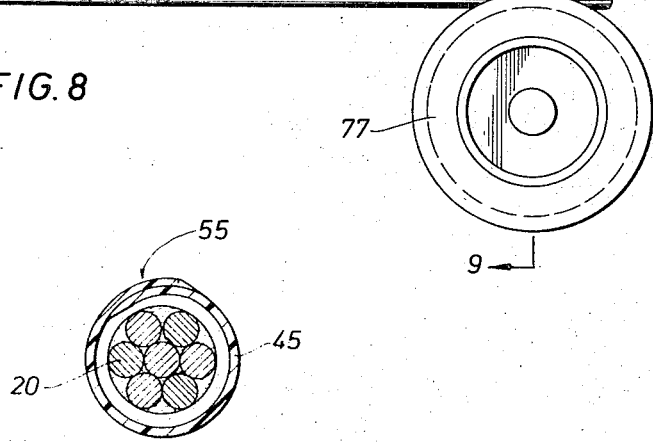
FIG. 8 is an enlarged, partially cross-sectional view of one of the die members which urges the overlapping edges of the plastic strip together to effect a bond.
Figure 10:
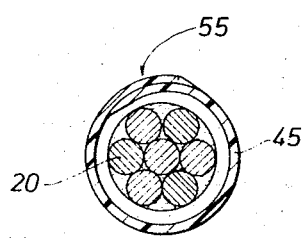
FIG. 10 is an exaggerated, exploded, cross-sectional view of the sheathed cable illustrating the loose fit between the cable and the plastic sheath and the lubricant filling the space between each strand of the cable.

After the plastic strip 45 is softened, the cable 20 and heated plastic strip 45 are advanced into and through a forming member 49. The forming member 49 has a substantially conically shaped passageway 50 therethrough which forms the plastic strip 45 about the cable 20 so that the ends of the plastic strip are in overlapping relationship as shown in FIGS. 6 and 8. Any type of forming member or plurality of forming members or dies may be utilized to shape the plastic strip 45 about the cable 20. As the cable 20 and plastic strip 45 pass out of the forming member 49, the overlapping strip is held in position by both the exit aperture 51 of the forming member 49 and the exit aperture 52 of the heating enclosure 44.

Figure 7:
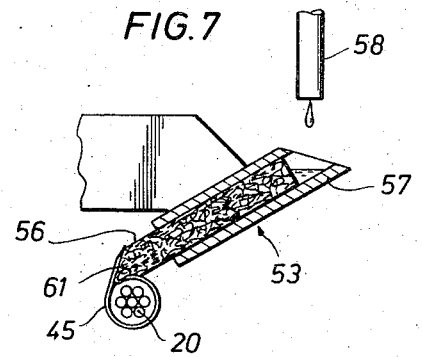
FIG. 7 is an exploded view of the solvent applicator ilustrating how solvent is applied to the overlapping contact edges of the plastic strip.

At this point, a bonding agent or bonding material is applied to the overlapped edges to bond the edges together to form a sheath. With the use of a polyvinylchloride plastic strip, it has been found advantageous to use a tetrahydrofran solvent as the bonding agent. The solvent is applied from an applicator generally designated as 53. Solvent 54 may be applied to the overlapping portion 55 of the tape 45 in a variety of ways, such as by a gravity flow system or a pressure feed system. The solvent coalesces the heated plastic material and causes it to fuse, forming a permanent bond. Referring to FIG. 7, there is shown a gravity feed system including an absorbent material wick 56 which is mounted in a support member 57. The upper end of the wick 56 is continuously wetted by the solvent 54 which drops from a tube 58 at a predetermined rate, which is adjustable by a valve 59 shown in FIG. 1. The wick is mounted so that the end 61 is interposed between each overlapping edge of the strip 45 to uniformly apply solvent to the surfaces which will be in contact when the edges are pressed together. The application of the solvent is critical, since if too much solvent is applied the edges will not bond together, and if too little solvent is applied either the edges bond together intermittently, or not at all. The heating and softening of the edges of the plastic strip 45 along with the uniform application of a predetermined amount of solvent causes a fast bonding reaction. As shown in FIG. 8, the edges of the plastic strip 45 are feathered so as to sofen more quickly than the thicker center portion of the strip thereby permitting the rapid bonding of the edges.

After the solvent 54 is applied to the overlapping edges, the sheathed cable passes through a die 63 which urges the solvent-wetted edges of the plastic strip 45 into contact with each other to effect a bond. If there is a significant frictional or drag force acting on the sheath, the bonded edges may split apart and/or the plastic sheath may rip or deform since it is still in a heated and wet state. The die 63 is advantageously made of Teflon so as to provide minimum resistance to the passage of the sheathed cable therethrough.

Additionally, the length of the die 63 is important. If the die is too long, the additional drag may damage the sheath. On the other hand, if the die is too short, the overlapped edges of the plastic strip 45 may not initially bond together. When the sheathed cable exits from the die 63, the overlapped portion 55 is still wet and warm. It is desirable to continue to press the overlapped edges together to effect a good strong bond.

In order to reduce frictional forces, a lubricant 64, such as oil, is applied through an applicator 65 to cover at least the overlapping edges 55 of the sheathed cable. A resilient member 67, such as a rod made of spring wire, acts against the sheathed cable to further maintain the overlapping edges 55 together. The sheathed cable then passes beneath a plurality of dies 68 which press the overlapping edges 55 together to ensure that a successful and effective bond is achieved between the edges. Then the sheathed cable is wound on a take-up reel 69. The take-up reel 69 may be spaced a sufficient distance apart from the last die 68 to permit the cooling and drying of the plastic sheath.

Figure 9:
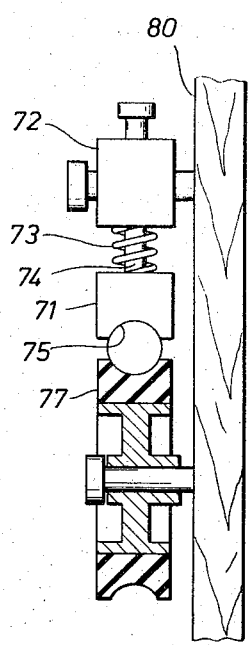
FIG. 9 is a side view of the die member in FIG. 8 taken along line 9—9.

The dies 68 are shown in detail in FIGS. 8 and 9 and include a lower member 71 which has a groove 75 formed therein to receive the overlapping edge portion 55 of the sheathed cable. The lower member 71 is resiliently mounted to an upper member 72 by springs 73 and guide rods 74. The upper member 72 is pivotally mounted at 76 to a support 80. The springs 73 and pivotal mounting 76 permit the lower member 71 to closely follow the path of the sheathed cable as it passes through the groove 75 without exerting excessive drag or frictional forces thereon. Additionally, different springs 73 may be selected so that a desired predetermined force can be applied to the sheathed cable. A plurality of rollers 77 cooperate with the dies 68 to apply the predetermined force to the overlapping edges of the plastic strip 45.

Alternatively, in place of the dies 68, an endless belt could be utilized to have the portion moving in the same direction as the cable come into contact with the overlapping edges 55 to apply a bonding force. The belt would move at substantially the same speed as the advancing sheathed cable so that minimum frictional forces would be applied to the overlapping edges while the bond is being effected.

The sheathed cable that is formed by the subject apparatus and method has a sheath which fits relatively loosely over the cable 20. Because of the loose fit, and the lubricant on the cable 20, relative movement is permitted between the cable 20 and the plastic sheath after the sheathed cable is embedded in concrete. Thus, the cable can easily be placed in tension to provide the necessary pre-stress to the concrete structure. Additionally, the bond that is achieved by the subject method and apparatus is sufficiently strong so that the subsequent rough handling of the sheathed cable or the high temperatures that may be encountered in use of the cable in hot climates will not destroy the bond, causing the sheath to open.

In the operation of the apparatus, the cable 20 is drawn from the supply reel 21 through the aligning assembly 23, which substantially aligns the cable 20 with the aperture 33 leading into the lubricating facilities 31. The cable 20 is drawn through the grease cylinder 36, and a coating of grease and rust inhibitor is applied to each strand of the cable. Excess grease is wiped off by a plurality of wipers 38 and 41. The strip of plastic tape 45 is advanced from its supply reel 46 into the heating enclosure 44 where the strip, and particularly the edges thereof, is heated so that it is softened and moisture is evaporated therefrom. The plastic strip 45 is then passed into the forming member 49 along with the cable 20 with the edges thereof in overlapping relationship. Solvent 54 is then applied to the contact surfaces of the overlapping edges. The sheathed cable then passes through a die 63, preferably made of Teflon to reduce friction, which urges the solvent wetted edges of the plastic strip together to effect a bond. A lubricant is then applied to the overlapping edges, and the sheathed cable passes first beneath a spring-tensioned member 67 and then beneath a plurality of spring-loaded dies 68, all of which tend to force the overlapping edges together to make sure there is an effective bond therebetween. The introduction of the oil 64 reduces friction on the sheath as the spring member 67 and dies 68 come in contact with it. The sheathed cable is then wound on a take-up reel 69.

It is to be understood that the above described embodiment is merely illustrative of an application of the principles of this invention and that numerous other arrangements and modifications may be made within the spirit and scope of the invention.

What is claimed is:

1. A method of manufacturing a sheathed cable for use as post-tensioned reinforcing member in concrete structures comprising the steps of:
    continuously advancing an elongated plastic strip having feathered edges;
    heating the plastic strip to soften at least the edges of said strip;

continuously advancing a multistranded cable into adjoining relationship with said advancing plastic strip;

applying grease to completely impregnate said advancing cable;

removing excess grease from said cable to provide a uniformly impregnated cable;

loosely forming said heated strip around said impregnated cable so that the heat softened edges of said strip are in overlapping relationship;

applying a solvent uniformly to the heated contiguous surfaces of the overlapping edges of said plastic strip;

pressing said overlapping edges together to effect an initial bond therebetween to form a sheath; and applying additional force to the overlapping portion of said plastic strip to ensure an effective bond of said plastic sheath.

2. A method of manufacturing a sheathed cable for use as post-tensioned reinforcing member in concrete structures comprising the steps of:

continuously advancing an elongated plastic strip having feathered edges;

heating the plastic strip to soften at least the edges of said strip;

continuously advancing a multistranded cable into adjoining relationship with said advancing plastic strip;

applying grease to completely impregnate said advancing cable;

removing excess grease from said cable to provide a uniformly impregnated cable;

loosely forming said heated plastic strip around said impregnated cable so that the heat softened edges of said strip are in overlapping relationship;

applying a solvent uniformly to the heated contiguous surfaces of the overlapping edges of said plastic strip;

pressing said overlapping edges together to effect an initial bond therebetween to form a sheath;

lubricating the exterior of the initially bonded overlapping portion of said sheath; and applying an additional bonding force to said lubricated overlapping portion to ensure an effective bond of said plastic sheath.

3. A method of manufacturing a sheathed cable as set forth in claim 2 wherein said grease is applied to said cable under pressure whereby the cable is fully loaded and coated with the grease.

* * * * *